United States Patent [19]

Ashby

[11] E Patent Number: Re. 33,570

[45] Reissued Date of Patent: Apr. 16, 1991

[54] CONTINUOUS FILLED ENVELOPE ASSEMBLY WITH NON-MARGINAL SPACED FEED HOLES

[75] Inventor: Robert E. Ashby, Quakertown, Pa.

[73] Assignee: Moore Business Forms, Inc., Grand Island, N.Y.

[21] Appl. No.: 284,385

[22] Filed: Dec. 14, 1988

Related U.S. Patent Documents

Reissue of:

[64] Patent No.: 4,645,123
Issued: Feb. 24, 1987
Appl. No.: 282,589
Filed: Jul. 13, 1981

[51] Int. Cl.[5] ..... B65D 27/10

[52] U.S. Cl. ..... 229/69

[58] Field of Search ..... 229/69; 53/450; 270/37; 282/11.5 A; 493/216; 206/804

[56] References Cited

U.S. PATENT DOCUMENTS

| | | | |
|---|---|---|---|
| Re. 31,752 | 12/1984 | Halse | 282/11.5 A |
| 3,104,799 | 9/1963 | Steidinger | 229/69 |
| 3,339,827 | 9/1967 | Steidinger | 229/69 |
| 3,554,438 | 1/1971 | Van Malderghem | 229/69 |
| 3,941,308 | 3/1976 | DiGirolomo et al. | 229/69 |
| 4,002,290 | 1/1977 | Van Malderghem | 229/69 |
| 4,010,889 | 3/1977 | Allen et al. | 229/69 |
| 4,095,695 | 6/1978 | Steidinger | 229/69 X |
| 4,108,352 | 8/1978 | Peschke | 229/69 |
| 4,113,281 | 12/1978 | Halse . | |
| 4,178,018 | 7/1979 | Halse . | |
| 4,230,262 | 10/1980 | Denay et al. | 229/69 |
| 4,277,016 | 7/1981 | Wakeman et al. | 229/69 |

*Primary Examiner*—Bryon P. Gehman
*Attorney, Agent, or Firm*—Nixon & Vanderhye

[57] ABSTRACT

A continuous, filled envelope assembly includes continuous, envelope forming webs and laterally abbreviated insert webs. The insert webs are capable of accurate feeding with the envelope webs, and also adapted to be processed independently, and include a row of spaced feed holes of one web superimposed on a non-marginal row of spaced feed holes of an adjacent web.

12 Claims, 2 Drawing Sheets

CONTINUOUS FILLED ENVELOPE ASSEMBLY WITH NON-MARGINAL SPACED FEED HOLES

Matter enclosed in heavy brackets [ ] appears in the original patent but forms no part of this reissue specification; matter printed in italics indicates the additions made by reissue.

BACKGROUND OF THE INVENTION

This invention relates to a continuous business form assembly and, more specifically, to a continuous, filled envelope assembly.

Continuous, filled envelope assemblies are disclosed in U.S. Pat. No. 3,941,308; British Patent No. 1,128,634 and Norwegian Patent No. 126673. As shown in U.S. Pat. No. 3,941,308, known continuous, filled envelope assemblies have included insert webs each including inserts extending laterally from a single, continuous, non-marginal feed strip, and insert webs each including inserts extending from two continuous, marginal feed strips. While these assemblies may have proven useful, the first does not have an advantage of the second, which is accurate feeding of the insert webs with the envelope webs. The second does not have an advantage of the first, which is laterally abbreviated insert webs capable of being fed and collated independent of the envelope webs.

SUMMARY OF THE INVENTION

It is an object of the present invention to provide a business form assembly constituting an improved, continuous, filled envelope assembly.

Another object of the invention is to provide a continuous, filled envelope assembly which includes insert webs capable of being accurately fed with the envelope webs and also laterally and/or longitudinally abbreviated insert webs capable of being fed and collated independent of the envelope webs.

Another object of the invention is to provide a continuous, filled envelope assembly which is inexpensive of manufacture, pleasing of appearance, and readily useful through ease of removal of insert material.

Another object of the invention is to provide a continuous, filled envelope assembly which is compactly and neatly stored, substantially without tenting.

These and other objects and advantages are provided by the invention, which is, in principal aspect, a continuous business form assembly comprising at least three webs. Each of the three webs is continuous in a longitudinal direction and has two spaced marginal edges in a transverse direction. A marginal row of spaced feed holes extends along each marginal edge, and a line of marginal perforations extends along each marginal row of spaced feed holes. The marginal row of spaced feed holes and marginal perforations thereby define two continuous, marginal feed strips along the two marginal edges.

Each of the three webs further has a line of non-marginal perforations adjacent one of the lines of marginal perforations, and two spaced transverse lines of perforations. The line of non-marginal perforations defines a non-marginal strip adjacent one of the marginal feed strips. The transverse lines of perforations define a sheet on the web.

The three webs are superimposed, with the feed holes, perforations, feed strips, and sheets thereof superimposed. Two of the webs are first and second webs.

The other of the webs is an intermediate third web located between the first and second webs. The intermediate third web, if more than one insert web is included, has a non-marginal row of spaced feed holes extending along the line of non-marginal perforations of the third web in the non-marginal strip thereof. The non-marginal strip of the third web, in this situation, is thereby a non-marginal feed strip.

The intermediate third web also defines transversely extending die cuts along its transverse lines of perforations. The die cuts extend fully across the web between the marginal lines of perforations, thereby interrupting the transverse lines of perforations of the intermediate web between the marginal lines of perforations. The die cuts leave only the marginal feed strips uncut.

The sheets of the first and second webs form envelopes for the sheets of the third web. So adapted, the sheets of the first and second webs are attached along at least the transverse lines of perforations, through the die cuts. For removal of the sheets of the third web from the envelopes, the third web includes a second line of non-marginal perforations, adjacent the other line of marginal perforations. The second line of non-marginal perforations is weakened so that it separates upon the application of a transverse force in the direction of the first line of non-marginal perforations.

With an assembly as described, accurate feeding of the intermediate web with the other web is provided by the superimposed, marginal feed strips of the three webs. If additional webs are included to provide envelope inserts, independent feeding of the additional webs with the intermediate third web is provided by the non-marginal feed strip of the intermediate third web. Formation of the sheets of the first and second webs into an envelope with substantial freedom from tenting is provided by the die cuts. Ease of separation of the assembly into units is also provided by the die cuts, since separation of the sheets after removal of the marginal feed strips requires separation of only the first and second sheets at the transverse lines of perforations.

BRIEF DESCRIPTION OF THE DRAWINGS

The preferred embodiment of the invention is described in relation to the accompanying drawing. The drawing includes two figures, briefly described as follows.

DETAILED DESCRIPTION OF THE PREFERRED EMBODIMENT

Referring to the accompanying drawing, the preferred embodiment of the invention is a continuous, filled envelope assembly 10.

Figure 1:
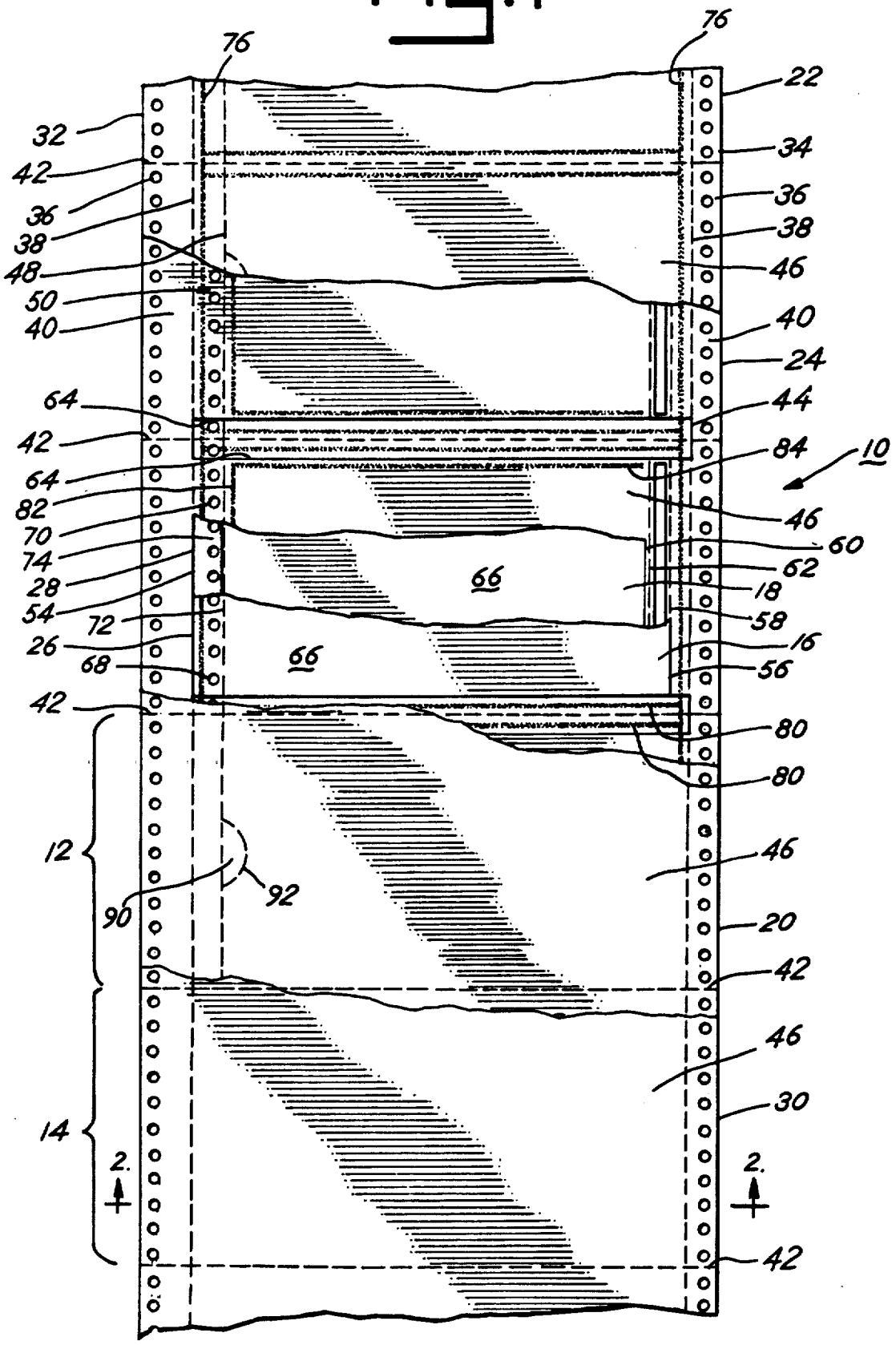
FIG. 1 is a plan view of the preferred embodiment of the invention, with portions of the webs of the embodiment cut away to reveal underlying detail.
Figure 2:
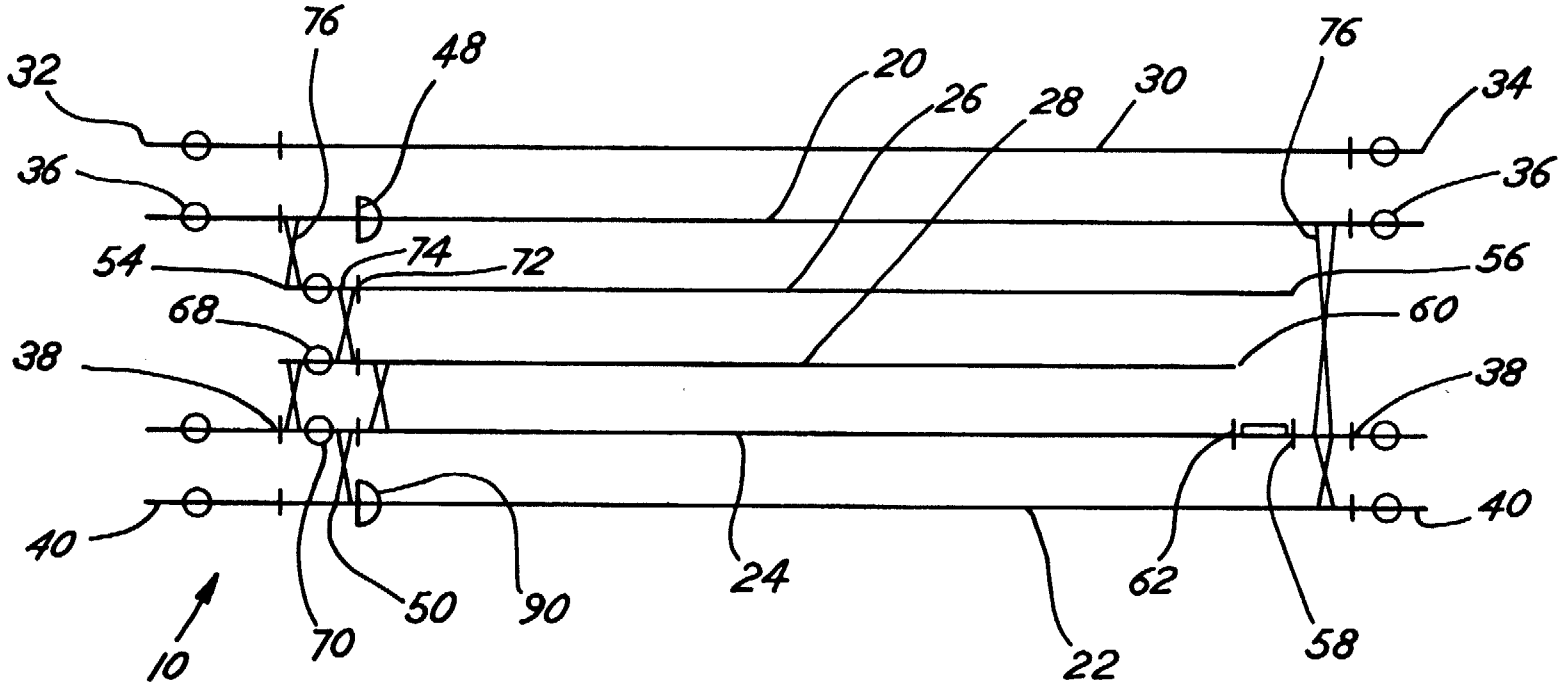
FIG. 2 is a cross-section, schematic view of the preferred embodiment, taken along line 2—2 in FIG. 1.

The assembly 10 provides a series of separable, filled envelopes, such as envelope 12 in FIG. 1, and a series of separable record forms, such as form 14 in FIG. 1. The envelopes 12 are filled with insert material including insert forms, such as insert form 16 in FIG. 1, and an insert envelope, such as insert envelope 18 in FIG. 1. As conventional, the record forms 14, envelopes 12 and insert forms 16 are imprinted in one operation with address and other information. Imprinting is accomplished through the use of pressure-sensitive transfer material on the backs of the record forms 14 and within the envelopes 12. Afterward, the envelopes 12 and forms 14 are separated, with the envelopes 12 delivered to recipients and the forms 14 retained as evidence records of delivery. The recipients may open the envelopes 12 and use the inserts as desired or instructed. As an example, the insert envelope 18 may be used as a return envelope for a message on the insert form 16. As another example, the insert envelope 18 may be used as a return envelope for payment of an account, where two insert forms 16 are provided as statements of the account, one for retention and one for return.

To provide the filled envelopes 12 and record forms 14, the assembly 10 includes first and second webs, respectively 20, 22, which form the envelopes 12; third, fourth and fifth webs, respectively 24, 26, 28, which form the inserts 16, 18; and sixth web 30, which forms the record forms 14. The third web 24 is intermediate, or between, the first and second webs 20, 22. The fourth and fifth webs 26, 28 are atop the third web 24, and the sixth web 30 is atop the first web 20.

The first, second, third and sixth webs 20, 22, 24 and 30 are each continuous in a longitudinal direction, which is the vertical direction in FIG. 1. Each web 20, 22, 24, 30 has two longitudinally extended marginal edges 32, 34, which are spaced apart in a transverse direction, perpendicular to the longitudinal direction. A marginal row of spaced feed holes 36 extends along each edge 32, 34 of the webs 20, 22, 24, 30. A marginal line of perforations 38 extends along each marginal row 36. The marginal lines and rows 38, 36 define marginal feed strips 40, and thus, each web 20, 22, 24, 30 has two removable marginal feed strips 40.

The webs 20, 22, 24, 30 each further has a series of longitudinally spaced, transverse lines of perforations 42 as in FIG. 1. The lines 42 of the webs 20, 22 and 30 extend across the webs from edge 32 to edge 34. The lines 42 of the third web 24 extend inward of the edges 32, 34 of the web 24, to rectangular die cuts 44. The lines 42 of the webs 20, 22, 24, 30 all define sheets 46 on the webs, and thus, each web 20, 22, 24, 30 has a series of separable sheets 46.

The sheets 46 of the web 24 are joined only along the marginal strips 40. The die cuts 44 eliminate any joint between the sheets 46 of the web 24 between the perforation lines 38. The longitudinal width of the die cuts 44 provides space for two glue lines 80, to be described, adjacent the transverse lines of perforations 42. Space is provided such that the sheets 46 of the web 24 are free of the glue lines 80.

The webs 20, 22 and 24 have a non-marginal line of perforations 48 extending along a single marginal feed strip 40. The lines 48 define removable non-marginal strips 50 on the webs 20, 22, 24. The web 30 has no line 48, or strip 50.

The webs 20, 22, 24 and 30 are superimposed. That is, the webs 20, 22, 24, 30 overlie on another, in the sequence previously described, with their common features superimposed, aligned or matched, one atop the other. Thus, the edges 32, 34 of the webs 20, 22, 24 and 30 are superimposed; the perforation lines 38 and 42 of the webs 20, 22, and 24 and 30 are aligned; the perforation lines 48 of the webs 20, 22 and 24 are aligned; the feed hole rows 36 are matched; and the sheets 46 and strips 40, 50 in the webs 20, 22 and 24 are placed one atop another.

The sheets 46 of the sixth web 30 form the record forms 14. The sheets 46 of the first and second webs 20, 22 form the envelopes 12. The sheets 46 of the third web 24, in combination with the remaining webs 26, 28, forms the inserts. To keep the record forms 14 removable from the envelopes 12, the web 30 is not permanently attached to the envelopes 12. To form the envelopes 12, the webs 20, 22 are attached to each other through the die cuts 44. The webs 20, 22, 24, 26, and 28 are all attached as a unit, as will be described.

The webs 26, 28 are non-continuous. Each web 26, 28 has a first marginal edge 54 extending along and between one of the marginal perforation lines 38, and the non-marginal perforation line 48, of the web 24. The web 26 extends transversely across the web 24 to a marginal edge 56 adjacent a second non-marginal perforation line 58 of the web 24, and the web 28 extends a lesser distance across the web 24 to a marginal edge 60 of the web 28 adjacent a non-marginal fold line 62 of the web 24. In the transverse direction, each web 26, 28 has spaced longitudinal edges 64 aligned with the edges of the die cuts 44.

The non-continuous webs 26, 28 are thus formed in series of unconnected sheets 66. Each sheet 66 has a marginal row of spaced feed holes 68 along the edge 54, which are superimposed with a non-marginal row of spaced feed holes 70 of the web 24. Each sheet 66 has a marginal line of perforations 72 superimposed on the non-marginal lines 48. When the webs 26 and 28 are included, the non-marginal strip 50 of the third web 24 is thus a feed strip. In the same circumstance, the sheets 66 define discontinuous feed strips 74 superimposed on the feed strip 50 of the third web 24.

The webs 20, 22, 24, 26 and 28 are all attached, as a unit. Continuous glue lines 76 extend along the marginal perforation lines 38 of the webs 20 and 22, inward of the feed strips 40. The glue lines 76 attach the web 20 to the webs 22, 24 and 26, and the web 22 to the web 24. The web 20 is attached to the web 22 in the area of the die cuts 44, to the web 24 adjacent the non-marginal perforation line 58 of the web 24, and to the web 26 in the area of the feed strip 74 of the web 26. The web 22 is attached to the web 24 in the area of the non-marginal feed strip 50 and to the web 24 between the non-marginal perforation line 58 and the adjacent feed strip 40 of the web 24. A discontinuous glue line on the webs 24, 28, superimposed on one of the continuous glue lines 76, attaches the feed strip 74 of the web 26 to the feed strip 74 of the web 28, and the feed strip 74 of the web 28 to the feed strip 50 of the web 24.

Transverse glue lines 80 further join the webs 20, 22. The lines 80 extend between the lines 76, in the area of the die cuts 44. The lines 80 are paired two to a die cut 44, one on either side of each transverse perforation line 42.

Final glue lines 82, 84 join the web 28 to the web 24, forming insert envelopes 18 of the sheets 66, 46 of the two webs.

As should now be apparent, the webs 26 and 28 may be fed together and attached to the web 24 through the use of the feed strips 50, 74 of the webs 24, 26, 28. The unit of webs 24, 26, 28 may then be fed and attached to the webs 20, 22 and fed to the web 30, through the feed strips 40 of the webs 20, 22, 24, 30. The assembly 10 may then be fed by strips 40 through a printer and such other equipment as desired. Separate envelopes 12 and record sheets 14 may be formed by perforation of the lines 38, 42. This perforation removes the strips 40, and separates the envelopes 12 from each other.

Thus, a recipient of an envelope 12 may receive a neat, sealed envelope 12. The recipient may open the envelope 12 by removing the non-marginal feed strips 50 of the webs 20, 22, thereby simultaneously removing the feed strips 50, 74 of the webs 24, 26, 28. The inserts 16, 18 can then be pulled and separated at perforation line 58 to remove them from the envelope 12 for use.

The inserts 16 and 18 are pulled from the envelope 12 by the application of transverse force across the envelope assembly. The side of the envelope 12 to the right in FIG. 1 is held, and force applied by the grasp of thumb notches 90 defined by thumb notch perforations 92 in webs 20 and 22. The notches 90 are located inward of strips 50 and 74, where a grasp of the notches 90 causes a simultaneous grasp of the inserts 16 and 18 therebetween. The notch perforations 92 and the perforation line 58 of web 24 are weakened such that they separate upon the application of a transverse force across the envelope assembly. As so constructed, insert and envelope 16, 18 separate from the envelope 12 as a unit.

An alternate method of opening the envelope 12 is to pull the insert 16 and envelope 18 from the envelope 12 by applying transverse force across the envelope assembly. The side of the envelope 12 to the right in FIG. 1 is held, and force applied by the grasp of thumb notches 90 defined by thumb notch perforations 92 in webs 20 and 22. The notches 90 are located inward of strips 50 and 74, where a grasp of the notches 90 causes a simultaneous grasp of the inserts 16 and 18 therebetween. The transverse force applied separates the thumb notch perforations 92 and the non-marginal line of perforations 48 of the webs 20, 22 and the line of perforations 58 of web 24, and removes the inserts 16, 18 from the envelope 12. The feed strips 50 and 74 of the webs 20, 22, 24, 26 and 28 are then removed from the inserts 16, 18 by separating at the line of perforations 72 on the webs 26 and 28 and the line of perforations 48 on the web 24.

What is claimed is:

1. A continuous business form assembly constituting a filled envelope assembly and comprising four webs, each of three of the webs being continuous in a longitudinal direction and having two spaced marginal edges in a transverse direction, a marginal row of spaced feed holes extending along a each marginal edge, a line of marginal perforations extending along each marginal row of spaced feed holes, the marginal row of spaced feed holes and marginal perforations thereby defining two continuous, marginal feed strips along the two marginal edges, and each of the three webs further having a line of non-marginal perforations adjacent a first of the lines of marginal perforations and two spaced transverse lines of perforations, the line of non-marginal perforations defining a non-marginal strip adjacent one of the marginal feed strips and the transverse lines of perforations defining a sheet on the web;

the three webs being superimposed with the feed holes, perforations, feed strips, and sheets thereof superimposed and the three webs being attached along the non-marginal strips;

two of the three webs being first and second webs and the other of the three webs being an intermediate third web located between the first and second webs, the intermediate third web defining transversely extending die cuts along the transverse lines of perforations of the intermediate third web between the marginal lines of perforations thereof, the die cuts thereby interrupting the transverse lines of perforations of the intermediate web between the marginal lines of perforations thereof;

the first web being attached to the second web along the transverse lines of perforations and through the die cuts, to form an envelope of the sheets of the first and second webs and an envelope insert of the the third web;

the intermediate third web having a non-marginal row of spaced feed holes extending along the line of non-marginal perforations of the intermediate third web in the non-marginal strip of the intermediate third web, the non-marginal strip of the third web thereby being a non-marginal feed strip;

the continuous business form assembly further comprising a non-continuous fourth web superimposed on the intermediate third web between the intermediate third web and the first web, the non-continuous fourth web having transverse edges in the transverse direction along the die cuts and marginal edges spaced in the transverse direction, one of the marginal edges of the non-continuous fourth web extending along the first of the lines of marginal perforations of the third web, the fourth web further having a line of marginal perforations superimposed upon the line of non-marginal perforations of the third web and a row of spaced feed holes superimposed on the non-marginal row of spaced feed holes of the third web, the non-continuous fourth web being attached along the non-marginal strip of the third web to the third web.

2. A continuous business form assembly as in claim 1 in which the line of non-marginal perforations of the intermediate third web is a first line of non-marginal perforations, and in which the intermediate third web defines a second line of non-marginal perforations adjacent the other of the lines of marginal perforations of the third web, the second line of non-marginal perforations being weakened to perforate upon the application of less transverse force than required to perforate the first line of non-marginal perforations.

3. A continuous business form assembly as in claim 1 in which the non-continuous fourth web is attached along the transverse edges thereof and along the line of marginal perforations thereof to the third web, to form an envelope of the fourth web and the sheet of the third web.

4. A continuous business form assembly as in claim 1 further comprising a further web being continuous in the longitudinal direction and having spaced marginal edges in the transverse direction, a marginal row of spaced feed holes extending along each marginal edge of the further web, a line of marginal perforations extending along each of the marginal row of spaced feed holes of the further web, the marginal rows of spaced feed holes and marginal perforations of the further web thereby defining marginal feed strips of the further web, the further web further having two spaced transverse lines of perforations defining a sheet on the further web; and the further web being superimposed on the first web opposite the intermediate web with the feed holes, marginal lines of perforations, marginal feed strips and sheets of the first and further webs superimposed.

*5. A continuous business form assembly constituting a filled envelope assembly and comprising four webs, each of three of the webs being continuous in a longitudinal direction and having two spaced marginal edges in a transverse direction, a marginal row of spaced feed holes extending*

*along each marginal edge, the marginal row of spaced feed holes thereby defining two continuous, marginal feed strips along the two marginal edges, and each of the three webs further having a line of non-marginal perforations and two spaced transverse lines of perforations, the line of non-marginal perforations defining a non-marginal strip adjacent one of the marginal feed strips; and the transverse lines of perforations defining a sheet on the web;*

*the three webs being superimposed with the feed holes, perforations, feed strips, and sheets thereof superimposed and the three webs being attached along the non-marginal strips;*

*two of the three webs being first and second webs and the other of the three webs being an intermediate third web located between the first and second webs, the intermediate third web defining transversely extending die cuts along the transverse lines of perforations of the intermediate third web between the marginal feed strips thereof, the die cuts thereby interrupting the transverse lines of perforations of the intermediate web between the marginal feed strips thereof;*

*the first web being attached to the second web along the transverse lines of perforations and through the die cuts, to form an envelope of the sheets of the first and second webs and an envelope insert of the third web;*

*the intermediate third web having a non-marginal row of spaced feed holes extending along the line of non-marginal perforations of the intermediate third web in the non-marginal strip of the intermediate third web, the non-marginal strip of the third web thereby being a non-marginal feed strip;*

*the continuous business form assembly further comprising a non-continuous fourth web superimposed on the intermediate third web between the intermediate third web and the first web, the non-continuous fourth web having transverse edges in the transverse direction along the die cuts and marginal edges spaced in the transverse direction, one of the marginal edges of the non-continuous fourth web extending along the first of the marginal feed strips of the third web, the fourth web further having a line of marginal perforations superimposed upon the line of non-marginal perforations of the third web and a row of spaced feed holes superimposed on the non-marginal row of spaced feed holes of the third web, the non-continuous fourth web being attached along the non-marginal strip of the third web to the third web.*

*6. A continuous business form assembly as in claim 5 in which the line of non-marginal perforations of the intermediate third web is a first line of non-marginal perforations, and in which the intermediate third web defines a second line of non-marginal perforations adjacent the other of the marginal feed strips of the third web, the second line of non-marginal perforations being weakened to perforate upon the application of less trnasverse force than required to perforate the first line of non-marginal perforations.*

*7. A continuous business form assembly as in claim 5 in which the non-continuous fourth web is attached along the transverse edges thereof and along the line of marginal perforations thereof to the third web, to form an envelope of the fourth web and the sheet of the third web.*

*8. A continuous business form assembly as in claim 5 further comprising a further web being continuous in the longitudinal direction and having spaced marginal edges in the transverse direction, a marginal row of spaced feed holes extending along each marginal edge of the further web, the marginal rows of spaced feed holes of the further web thereby defining marginal feed strips of the further web, the further web further having two spaced transverse lines of perforations defining a sheet on the further web; and the further web being superimposed on the first web opposite the intermediate web with the feed holes, marginal feed strips and sheets of the first and further webs superimposed.*

*9. A continuous business form assembly including a plurality of filled envelope assemblies, each of which includes at least a pair of first and second outer webs which comprise a plurality of first envelopes, said first and second outer webs extending continuously in a longitudinal direction, each of said first envelopes being defined in part by transversely extending lines of perforations spaced longitudinally of each other along said first and second webs; said first and second webs having a plurality of feed holes arranged longitudinally along marginal edges of said first and second webs; each of said assemblies further comprising a pair of insert envelope webs and an insert web, wherein at least one of said pair of insert envelope webs and said insert web are laterally abbreviated with respect to said first and second outer webs, and another of said pair of insert envelope webs and said insert web extend across the entire width of the web, and further wherein said pair of insert envelope webs and said insert web each include feed means permitting said insert envelope webs and said insert web to be fed independently of said first and second outer webs.*

*10. A continuous business form assembly as defined in claim 9 wherein at least one of the insert web and said pair of insert envelope webs is non-continuous in the longitudinal direction.*

*11. A continuous business form assembly as defined in claim 10 wherein the insert web and one of said pair of insert envelope webs are non-continuous in the longitudinal direction.*

*12. A continuous business form assembly as defined in claim 11 wherein the other of said insert envelope webs is continuous in the longitudinal direction.*

* * * * *